Sept. 15, 1970           J. W. AARON            3,528,520
                    SNOWMOBILE SAFETY PAD
Filed Nov. 1, 1968                          2 Sheets-Sheet 1

INVENTOR.
JOHN W. AARON,
BY
Berman, Davidson & Berman
ATTORNEYS.

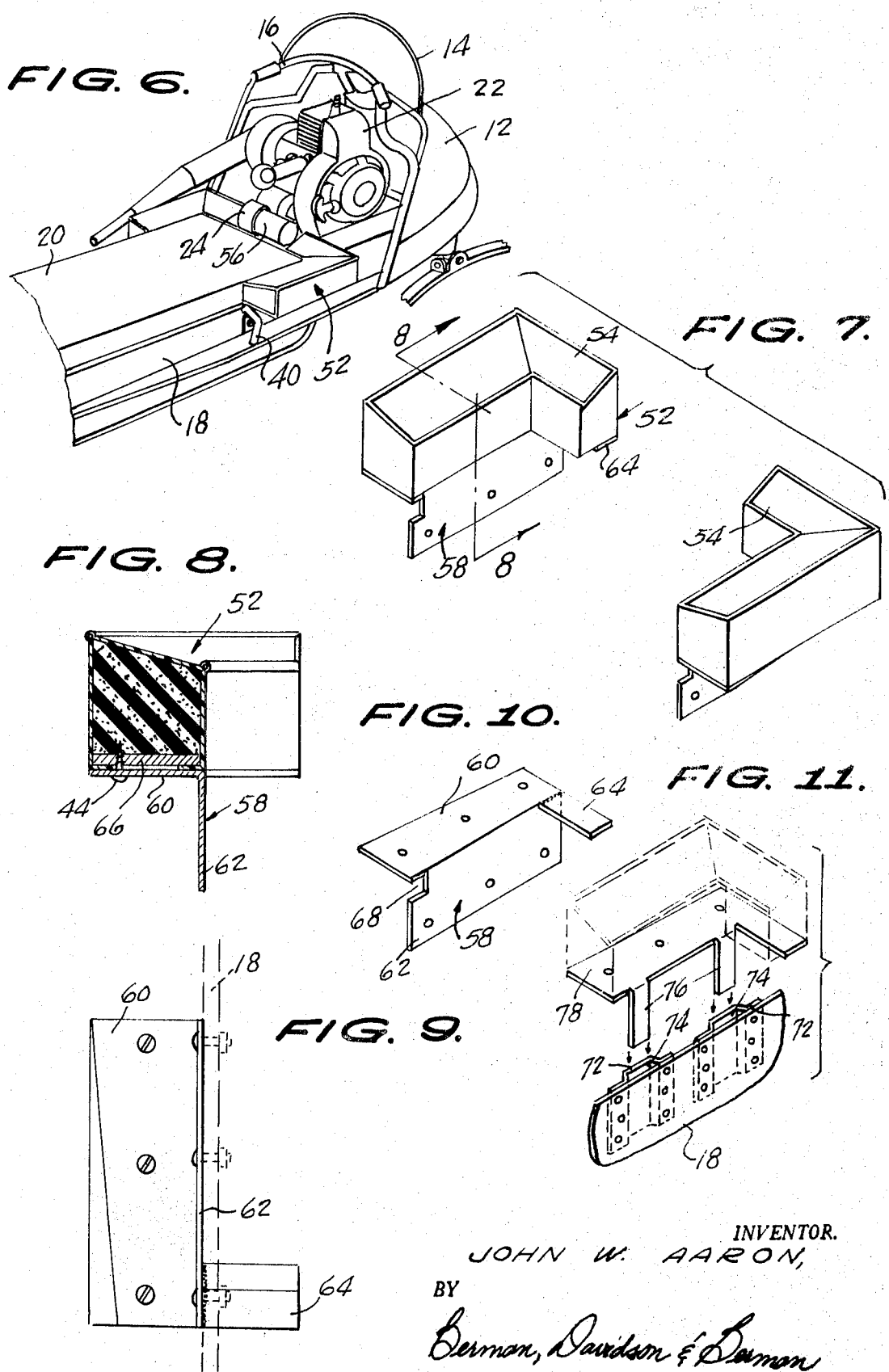

United States Patent Office 3,528,520
Patented Sept. 15, 1970

3,528,520
SNOWMOBILE SAFETY PAD
John W. Aaron, 720 Main St., Evanston, Wyo. 82930
Filed Nov. 1, 1968, Ser. No. 772,700
Int. Cl. B62d 55/00
U.S. Cl. 180—9.24                              7 Claims

ABSTRACT OF THE DISCLOSURE

A device for use with a snowmobile comprising a safety pad including angle iron means for securing to the sides of a snowmobile with resilient pad means secured thereto to form a barrier or upstanding member around the front portion of a snowmobile. The barrier or pad means may be made in one piece or more than one piece and may be provided with lug means for detachably connecting it to the frame of the snowmobile.

---

The present invention relates to a snowmobile and more particularly to providing such a device with cushioning pads at various positions around the frame thereof.

It is an object of the present invention to provide a safety pad for a snowmobile which safety pad can be readily connected to and detached from snowmobiles now in the field.

It is another object of the present invention to provide a snowmobile with resilient cushioning pad means that can be disposed around the front portion of the seat so as to prevent the knees of a person riding the vehicle from sustaining damage upon the knee and the shin.

It is yet another object of the present invention to provide a snow machine with cushioning safety pad means around the front portion thereof so that anyone riding the vehicle in a speed or maneuverability race and the like can sit upon the machine in a kneeling position for the purpose of gaining better control of the machine, without having his knees inadvertently slip off the seat cushion.

It is yet another object of the present invention to provide a barrier or upstanding member disposed around the front portion of a snowmobile so that a person who is operating the machine and is kneeling on the snowmobile seat cushion cannot have his knees inadvertently slip either sideways or forward off the snowmobile cushion.

It is yet another object of the present invention to provide safety pad means for use with a snowmobile which can be made of a single member and can have a U-shaped configuration so as to fit around the sides and the forward edge of the snowmobile cushion.

It is yet another object of the present invention to provide safety pad means for attachment to the seat of a snowmobile which can be made of two separate members, each disposed adjacent the forward side edge of the cushion or seat of a snowmobile with a portion thereof turned inwardly so as to extend transversely of the front portion of the snowmobile seat.

It is yet another object of the present invention to provide a safety pad for quick attachment to the frame of a snowmobile, which can be readily attached and detached therefrom without the use of bolt members and the like.

Various other objects and advantages of the present invention will be readily apparent from the following detailed description, when considered in connection with the accompanying drawings forming a part thereof, and in which:

FIG. 6 is a perspective view of a snowmobile with a modified safety pad disposed thereon;

FIG. 7 is an exploded detail view illustrating the safety pad means shown in FIG. 6;

FIG. 8 is a section taken along the lines 8—8 of FIG. 7;

FIG. 9 is a bottom plan view of the safety pad means illustrated in FIG. 8;

FIG. 10 is a perspective view of the angle iron means utilized with the safety pad means shown in FIG. 8; and FIG. 11 is a modification of the safety pad illustrated in FIGS. 6 to 10, inclusive.

Figure 1:
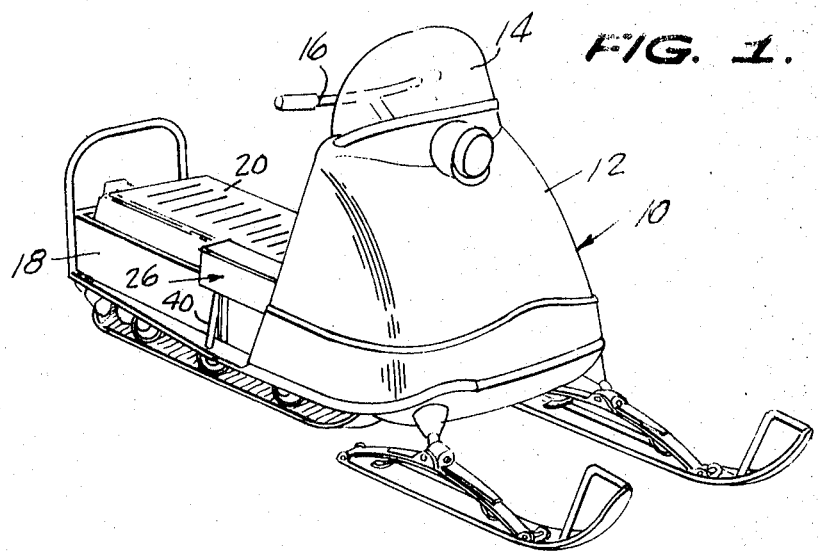
FIG. 1 is a perspective view of the snowmobile embodying the safety pad means of the present invention.

Referring to the drawings, the reference numeral 10 generally designates a snow machine or a snowmobile provided with a front hood 12 and a windshield 14 and the usual steering device 16.

The snowmobile is provided with a rectangular rigid frame 18 on which is disposed a cushion 20 forming a seat for the operator.

Figure 2:
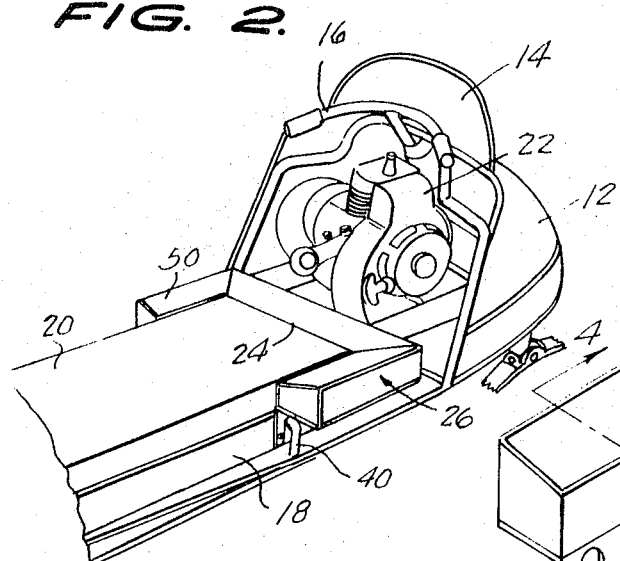
FIG. 2 is another perspective view of the snowmobile illustrating the safety pad means, as it is seen from the rear of the snowmobile vehicle and looking in a forward direction.
Figure 5:
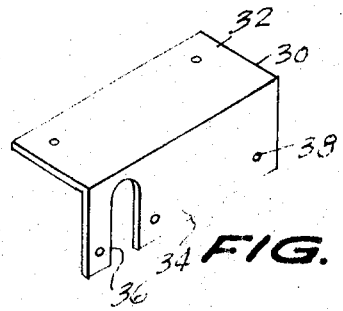
FIG. 5 is a detail view of the angle iron means included in the safety pad means.

The engine 22, as best seen in FIG. 2, is disposed within the interior of the hood 12, and is adjacent the front end 24 of the cushion 20 forming the seat. The cushion 20 is of a substantially rectangular configuration and is provided with a safety pad 26, which extends alongside of both the front side portions of the cushion, as well as transversely of or across the front end 24 of the cushion.

The safety pad 26 is provided with angle irons 30 having a flat top portion 32 and a vertical side 34. The angle irons are provided so that the left angle iron has its vertical side 34 disposed on the inner side while the right angle iron also has its vertical side 34 disposed inwardly adjacent the frame 18 of the snowmobile. The sides 34 are provided with vertical elongated slots 36 in the rear thereof and with openings 38 therein for bolting the angle irons to the frame 18.

Referring to FIG. 2, it will be seen that the frame 18 is provided with a loop or handle member 40 thereon and the member 40 extends through the slot 36 of the angle iron adjacent thereto when it is disposed on the front end of the snowmobile seat.

The top portions 32 of the angle irons are provided with a plywood U-shaped member 42 disposed thereon and secured thereto by a plurality of screws 44. The plywood member 42 has disposed thereon a substantially square, tapered U-shaped cushion or pad 46, which is made of foam rubber and covered with expanded vinyl 48.

It will be noted that the upper portion 50 of the pad 46 extends above the upper surface of the cushion 20 so as to form a wall or upstanding member or barrier around the front side edges of the cushion 20 and across the entire front end 24 of the cushion forming the seat.

With this arrangement, the operator of the snowmobile can kneel on the front portion of the cushion 20, so as to operate the snow machine in a kneeling position. The operation or riding of the snow machine in this kneeling position will give the operator greater control over the maneuverability of the snowmobile, and especially at high speed.

The provision of the pad 46 with the upper portion 50 thereof disposed so as to extend above the cushion 20 will prevent the operator's knees from slipping either sideways or forward off the cushion 20, so as to prevent any inadvertent injury to the knee or the shin. Referring to the embodiment of the invention shown in FIGS. 6 to 10, the safety pad 52 is formed in two L-shaped sections 54, of identical construction, except that they are in opposed relationship so as to face inwardly adjacent the side of the frame 18.

Figure 3:
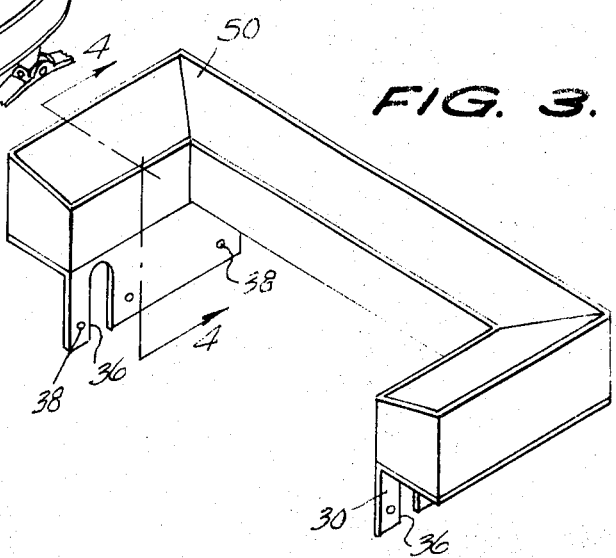
FIG. 3 is a perspective, enlarged detail view of the safety pad means of the present invention shown in FIG. 2.
Figure 4:
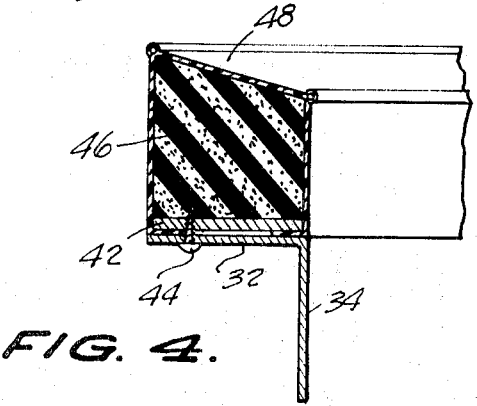
FIG. 4 is a section taken along the lines 4—4 of FIG. 3.

In this embodiment of the invention, a portion 56 of the engine is disposed adjacent the front end 24 of the cushion 20 and would interfere with a continuous or a one-piece safety pad, such as that illustrated in FIG. 3.

In this embodiment of the invention, the angle irons 58 have a flat top side 60 and a vertical side 62. The top side 60 is provided with an inwardly extending flat portion 64 welded to the front portion of the angle iron 58, as best seen in FIG. 10. A piece of plywood 66 is disposed on the top 60 and secured thereto by the screws 44. The pad is formed of the same material as pad 46 except that the pad is of L-shaped configuration, and is disposed over the top 60 and the inwardly turned sections 64, as best seen in FIG. 7. The rear end of the sides 62 are provided with a notch or a slot 68 therein to fit over the loop or handle member 40. The sides 62 are also provided with the same holes as described in connection with pad 46 so as to secure the pads to each side of the frame 18, as best seen in FIG. 9.

With respect to the embodiment of the invention illustrated in FIG. 11, this is substantially the same as that described in connection with FIGS. 6 to 10, except that the frame 18 is provided with U-shaped brackets 72 secured to the sides thereof so as to form a receiving slot 74 for two vertically spaced legs 76 of the top side 78 of the angle member. With this embodiment of the invention, the pads can be secured to each side of the frame 18 by merely slipping the legs 76 into the corresponding slots 74. This embodiment of the invention is also utilized where a portion of the engine would interfere with a U-shaped continuous pad.

Thus, the present invention provides a snowmobile with safety pad means designed to prevent broken legs and injured knees and for comfort in riding when the operator of the snowmobile rides it on his knees. The pad means will prevent the rider's knees from slipping off when the snow and ice collect on the seat of the machine, as occurs in some instances, so that he cannot slip off the pad or seat, making riding in the kneeling position much safer and more enjoyable and thus, giving better control of the speed and maneuverability of the machine.

From the foregoing description, it will be apparent that various changes may be made in the form, location and relative arrangement of several parts without departing from the essential characteristics of the invention, and it is to be understood that this invention is not to be limited, except by the scope of the appended claims.

What is claimed is:

1. In combination, a snowmobile with a rigid frame and a relatively flat cushion on said frame forming a straddle type operator seat, and a detachable safety pad extending above said cushion adjacent its opposite front sides and front edge to prevent the knees of an operator from slipping off said cushion.

2. The combination of claim 1 wherein said pad is substantially U-shaped with the bight of the U disposed completely across said front edge and the legs of the U disposed along said opposite side edges.

3. The combination of claim 2 wherein said safety pad includes angle iron members with slot means for securing it to said frame.

4. The combination of claim 1 wherein said pad is made of two separate L-shaped sections extending partially along said front edge.

5. The combination of claim 4 wherein said pad includes angle iron members with means for securing them to the opposite sides of said frames.

6. The combination of claim 5 wherein said means includes bracket means on said frame and vertical lugs adapted to fit into said bracket means.

7. The combination of claim 6 wherein said pads include a plywood base with a vinyl covering secured thereto filled with foam rubber.

References Cited

UNITED STATES PATENTS

| | | | |
|---|---|---|---|
| 3,099,483 | 5/1962 | Hofberg | 297—458 X |
| 3,167,351 | 1/1965 | Butler | 297—423 |
| 3,352,570 | 11/1967 | Cordrey | 297—195 X |

RICHARD J. JOHNSON, Primary Examiner

U.S. Cl. X.R.

180—5; 280—150; 297—427